United States Patent
Lee et al.

(10) Patent No.: US 7,744,834 B2
(45) Date of Patent: Jun. 29, 2010

(54) METHOD FOR MANUFACTURING METAL NANOPARTICLES

(75) Inventors: Kwi-Jong Lee, Suwon-si (KR);
Jae-Woo Joung, Suwon-si (KR);
Byung-Ho Jun, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 531 days.

(21) Appl. No.: 11/785,094

(22) Filed: Apr. 13, 2007

(65) Prior Publication Data

US 2008/0041270 A1 Feb. 21, 2008

(30) Foreign Application Priority Data

Jul. 10, 2006 (KR) .................. 10-2006-0064481

(51) Int. Cl.
*C01G 5/00* (2006.01)
*C01G 55/00* (2006.01)
*C01G 7/00* (2006.01)
*C22B 11/00* (2006.01)
*C09D 11/00* (2006.01)
*C22C 5/06* (2006.01)
*C22C 5/02* (2006.01)
*C22C 5/04* (2006.01)

(52) U.S. Cl. .................. 423/23; 423/22; 423/42; 106/31.92; 75/739; 75/741; 75/743; 75/744; 420/501; 420/505

(58) Field of Classification Search .......... 423/23, 423/42; 502/170, 326, 330, 347, 352; 75/793, 75/741, 743, 744; 420/501, 505
See application file for complete search history.

(56) References Cited

U.S. PATENT DOCUMENTS

| 6,103,868 | A | 8/2000 | Heath et al. |
| 6,645,444 | B2 | 11/2003 | Goldstein |
| 6,878,184 | B1 | 4/2005 | Rockenberger et al. |
| 7,160,525 | B1 | 1/2007 | Peng et al. |

(Continued)

FOREIGN PATENT DOCUMENTS

JP 10-195505 7/1998

(Continued)

OTHER PUBLICATIONS

K. J. Lee et al., "Environmentally Friendly Synthesis of Organic-Soluble Silver Nanoparticles for Printed Electrons", Nanotechnology, vol. 18, (2007), pp. 1-5.

(Continued)

*Primary Examiner*—Timothy C Vanoy
*Assistant Examiner*—Daniel Berns

(57) ABSTRACT

A method for manufacturing metal nanoparticles, the method including forming a mixture by dissociating a metallic salt of a metal selected from the group consisting of Ag, Pd, Pt, Au and an alloy thereof as a metal precursor in fatty acid; and adding a metallic salt of a metal selected from the group consisting of $Sn(NO_3)_2$, $Sn(CH_3CO_2)_2$, and $Sn(acac)_2$ as a metallic catalyst into the mixture and mixing the mixture and the metallic salt. According to the method, metal nanoparticles have a uniform particle size distribution and a high yield by performing in a non-aqueous environment without using any organic solvent, and are environmentally friendly due to no use of a reducing agent.

17 Claims, 2 Drawing Sheets

U.S. PATENT DOCUMENTS

| | | | |
|---|---|---|---|
| 7,270,694 | B2 | 9/2007 | Li et al. |
| 2003/0168639 | A1 | 9/2003 | Cheon et al. |
| 2006/0073667 | A1 | 4/2006 | Li et al. |
| 2006/0083694 | A1* | 4/2006 | Kodas et al. .................. 424/46 |
| 2006/0254387 | A1* | 11/2006 | Lee et al. ...................... 75/252 |
| 2007/0018140 | A1 | 1/2007 | Lee et al. |
| 2007/0099357 | A1 | 5/2007 | Li et al. |
| 2007/0190323 | A1 | 8/2007 | Lee et al. |
| 2007/0275259 | A1 | 11/2007 | Lee et al. |
| 2007/0289483 | A1 | 12/2007 | Cho et al. |
| 2008/0000382 | A1 | 1/2008 | Li et al. |
| 2008/0072706 | A1 | 3/2008 | Lee et al. |
| 2008/0085594 | A1 | 4/2008 | Li et al. |
| 2008/0087137 | A1 | 4/2008 | Shim et al. |
| 2008/0134936 | A1 | 6/2008 | Kamikoriyama et al. |
| 2008/0138643 | A1 | 6/2008 | Lee et al. |
| 2008/0146680 | A1 | 6/2008 | Sato |

FOREIGN PATENT DOCUMENTS

| | | |
|---|---|---|
| JP | 2004-183009 | 7/2004 |
| KR | 10-2005-0101101 | 10/2005 |
| WO | 2005/101427 A1 | 10/2005 |

OTHER PUBLICATIONS

K. J. Lee et al., "Direct Synthesis and Inkjetting of Silver Nanocrystals toward Printed Electrons", Nanotechnology, vol. 17, (2006), pp. 2424-2428.

K. J.Lee et al., "Direct Synthesis and Bonding Origins of Mono-layer Protected Silver Nanocrystals from Silver Nitrate through it situligand exchange", Journal of Colloid and Interface Science, vol. 304 (2006), pp. 92-97.

I. K. Shim et al., "An Organometallic Route to Highly Monodispersed Silver Nanoparticles and their Application to Ink-Jet Printing", Materials Chemistry and Physics, vol. 110 (2008), pp. 316-321.

Y. A. Krutyakov et al., "Synthesis and Properties of Silver Nanoparticles: Advances and Prospects", Russian Chemical Reviews, vol. 77, (2008), pp. 233-257.

C. Tian et al., "One-Step, Size-Controllable Synthesis of Stable Ag Nanoparticles", Nanotechnology, vol. 18 (2007), pp. 1-7.

H. Hiramatsu et al., "A Simple Large-Scale Synthesis of Nearly Monodisperse Gold and Silver Nanoparticles with Adjustable Size and with Exchangeable Surfactants", Chem. Mater. vol. 16, No. 13(2004), pp. 2509-2511.

D. V. Leff et al., "Synthesis and Characterization of Hydrophonic, Organically-Soluable Gold Nanocrystals Functionalized with Primary Amines", Langmuir, vol. 12, (1996), pp. 4723-4730.

Y. Li et al., "Facile Synthesis of Silver Nanoparticles Useful for Fabrication of High-Conductivity Elements for Printed Electronics", Journal of American Chemical Society, vol. 127, (2005), pp. 3266-3267.

A. Manna et al.,"Formation of Silver Nanoparticles from a N-Hexadecylethylenediamine Silver Nitrate Complex", Langmuir, vol. 17, (2001), pp. 6000-6004.

Y. Kashiwagi et al., "Facile Size-Regulated Synthesis of Silver Nanoparticles by Controlled thermolysis of Silver Alkylcarboxylates in the Presences of Alkylamines with Different Chain Lengths", Journal of Colloid and Interface Sciences, vol. 300, (2006), pp. 169-175.

B. L. Cushing et al., "Recent Advances in the Liquid-Phase of Inorganic Nanoparticles", Chem. Rev. vol. 104 (2004), pp. 3893-3946.

* cited by examiner

METHOD FOR MANUFACTURING METAL NANOPARTICLES

CROSS-REFERENCE TO RELATED APPLICATIONS

This application claims the benefit of Korean Patent Application No. 10-2006-0064481 filed on Jul. 10, 2006 with the Korean Intellectual Property Office, the contents of which are incorporated here by reference in their entirety.

BACKGROUND

1. Technical Field

The present invention relates to a method for manufacturing metal nanoparticles, more particularly, to a method for manufacturing which may synthesize highly concentrated nanoparticles having a small size and a uniform size distribution at low temperature without using an additional organic solvent or a reducing agent.

2. Description of the Related Art

There are two major methods for chemically synthesizing metal nanoparticles, namely a vapor phase process and a colloidal process. The colloidal process capable to synthesize uniform nanoparticles with low cost has been generally used because the vapor phase process using plasma and mechanical gas vaporization requires highly expensive equipments.

The method for manufacturing metal nanoparticles by the colloidal process includes a method for manufacturing hydrosol-formed metal nanoparticles by additional use of a reducing agent or a surfactant after dissociating a metallic compound in an aqueous system. As another method, a phase transfer method is the method for manufacturing metal nanoparticles which can be dispersed in a non-aqueous phase by transferring from an aqueous phase to a non-aqueous phase.

This method, however, provides a very low yield because it is limited by the concentration of the metal compound solution when the nanoparticles are synthesized. In other words, the metal nanoparticles having a uniform size distribution may be formed only when the concentration of the metal compound is 0.05 M or less. Therefore, it is not suitable for the mass production, because there is a limit on the yield of metal nanoparticles and more than 1 liter of a reactor is required to obtain metal nanoparticles having a uniform size distribution of several grams. Also, the use of the phase transfer agent is not desirable in the aspect of the cost.

SUMMARY

The present invention is to solve the problems associated with the conventional methods as mentioned above and provide a method for manufacturing metal nanoparticles which have a uniform particle size distribution and a high yield by performing in a non-aqueous environment without using any organic solvent, and may be environment-friendlily due to no use of a reducing agent.

The present invention further provides metal nanoparticles produced by the above-mentioned method and conductive ink which includes the metal nanoparticles thus produced.

Additional aspects and advantages of the present invention will be set forth in part in the description which follows and, in part, will be obvious from the description, or may be learned by practice of the invention.

According to one aspect of the present invention, a method for manufacturing metal nanoparticles including: forming a mixture by dissociating a metal precursor in fatty acid; and adding a metallic salt of a metal selected from the group consisting of Sn, Mg and Fe as a metallic catalyst into the mixture and mixing the mixture and the metallic salt, may be provided.

Here, the metal precursor may be a metallic salt of a metal selected from the group consisting of Ag, Pd, Pt, Au and an alloy thereof. According to an embodiment, it is preferable that the metal precursor be a silver salt selected from the group consisting of $AgBF_4$, $AgCF_3SO_3$, $AgNO_3$, $AgClO_4$, $Ag(CH_3CO_2)$, $AgPF_6$ and $Ag_2O$. Also, the metal precursor may be mixed in a molar ratio of 0.01 to 1 molar ratio with respect to the fatty acid.

The fatty acid may be at least one selected from the group consisting of saturated fatty acid, oleic acid, linoleic acid, linolenic acid and highly unsaturated acid.

According to an embodiment, the forming the mixture further may include heating mixture to a temperature range of 40 to 80° C. after dissociating the metal precursor in the fatty acid.

The metallic catalyst may be a metallic salt selected from the group consisting of $Sn(NO_3)_2$, $Sn(CH_3CO_2)_2$, $Sn(acac)_2$, $Mg(NO_3)_2$, $Mg(CH_3CO_2)_2$, $Mg(acac)_2$, $FeCl_2$, $FeCl_3$ and $Fe(acac)_2$. Here, the "acac" is an abbreviation of acetylacetonate ion. Also here, the metallic catalyst may be mixed in a molar ratio of 0.001 to 0.5 with respect to the metal precursor.

According to an embodiment, the adding the metallic catalyst and the mixing may include: adding the metallic catalyst while agitating the mixture; and heating the mixture to a temperature range of 80 to 150° C. Here, the mixture may be reacted for 0.5 to 4 hours at the temperature range.

The method for manufacturing metal nanoparticles by the present invention may further include obtaining the metal nanoparticles.

Here, the obtaining the metal nanoparticles may be performed by adding polar solvent into the mixture and by precipitating the nanoparticles. According to an embodiment, the polar solvent may be selected from the group consisting of methanol, ethanol, propanol, acetone, ether and a mixture thereof.

The obtaining the nanoparticles may further include separating nanoparticles, which are precipitated, by centrifugal separator from the mixture.

In the present invention, the mixture further may include at least one organic solvent selected from the group consisting of toluene, xylene, chloroform, dichloromethane and alkane having carbon numbers of 6 to 18 such as hexane, tetradecane and the like, according to need. Also, the mixture may further include at least one reducing agent selected from the group consisting of $NaBH_4$, $LiBH_4$, $KBH_4$, tetrabutylammonium borohydride, $N_2H_4$, $PhHNNH_2$, glycol, glycerol, dimethylformamide, 1,2-pentanediol, and 1,2-hexanediol.

According to another aspect of the present invention, metal nanoparticles manufactured by the manufacturing method and inductive ink having the metal nanoparticles are provided. Here, the metal nanoparticles have a uniform size distribution, the size being between 1 and 10 nm.

DETAILED DESCRIPTION

Figure 1:
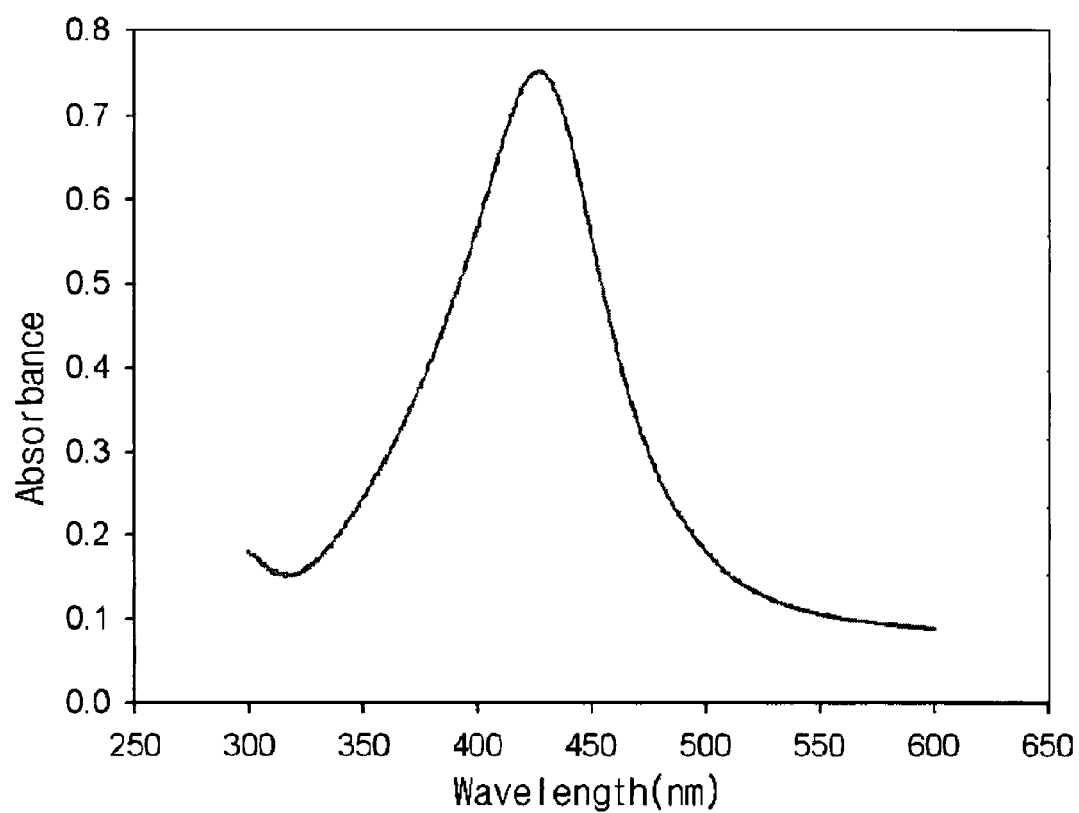
FIG. 1 is an absorbance graph of silver nanoparticles manufactured by one embodiment of the present invention.

Hereinafter, a method for manufacturing metal nanoparticles according to the present invention will be explained in more detail.

The present invention is to easily manufacture an oil-based ink without an additional surfactant substitution by reaction in non-aqueous system not in aqueous or aqueous/non-aqueous system, and is to environment-kindly synthesize highly concentrated nanoparticles having a uniform size distribution in comparison with the conventional method.

First, the method for manufacturing metal nanoparticles of the present invention includes forming a mixture by dissociating a metal precursor in fatty acid The metal precursor used in the present invention may be a metallic salt of a noble metal such as Ag, Pd, Pt, Au or an alloy thereof. Concretely, in the process of manufacturing silver nanoparticles by reducing silver ion, the silver ion may be provided as a form of silver salt or organic metal of silver. According to one embodiment of the present invention, the silver salt such as $AgBF_4$, $AgCF_3SO_3$, $AgNO_3$, $AgClO_4$, $Ag(CH_3CO_2)$, $AgPF_6$, $Ag_2O$ or etc may be used.

Here, the metal precursor may be mixed in a molar ratio of 0.01 to 1 molar ratio with respect to the fatty acid. It is not preferable if the content of the metal precursor is more than 1 molar ratio with respect to the fatty acid because the metal precursor can not be dissociated. It is not preferable, either if the content of the metal precursor is less than 0.001 molar ratio with respect to the fatty acid because productivity decreases.

The fatty acid used in the present invention is a component functioning as dispersion stabilizer or capping molecule, and size and dispersion stabilization of metal nanoparticles, which is finally produced, may be obtained by the fatty acid. Compound such as saturated fatty acid ($C_nH_{2n}O_2$), oleic acid ($C_nH_{2n-2}O_2$), linoleic acid($C_nH_{2n-4}O_2$), linolenic($C_nH_{2n-6}O_2$) or highly unsaturated acid ($C_nH_{2n-8}O_2$, $CnH_{2n-10}O_2$, $C_nH_{2n-12}O_2$) may be used as the fatty acid. Concretely, dodecanoic acid(laulic acid, $C_{11}H_{23}COOH$), oleic acid ($C_{17}H_{33}COOH$), hexadecanoic acid(palmitic acid, $C_{15}H_{31}COOH$) or tetradecanoic acid(myristic acid, $C_{13}H_{27}COOH$) may be used, but not limited thereby.

The mixture formed by dissociating the metallic precursor in the fatty acid may be heated to a temperature range of 40 to 80° C.

Next, the metallic catalyst is added to the mixture and mixed.

In the present invention, a metallic salt of a metal selected from the group of Sn and Fe is used as a metallic catalyst. This metallic catalyst may effectively reduce the metal ion such as a silver ion or etc while the metallic catalyst oxidizes as shown in the following equation because standard reduction potential for a metal of a metallic catalyst is lower than that for a metal of a metal precursor.

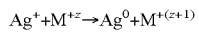

$$Ag^+ + M^{+z} \rightarrow Ag^0 + M^{+(z+1)}$$

The available metallic catalyst may include $Sn(NO_3)_2$, $Sn(CH_3CO_2)_2$, $Sn(acac)_2$, $FeCl_2$, $FeCl_3$ and $Fe(acac)_2$, and is not limited to such examples set forth here. Here, the "acac" is an abbreviation of acetylacetonate ion.

The metallic catalyst may be mixed in molar ration of 0.001 to 0.5 with respect to metal precursor. It is not preferable if the content of the metallic catalyst is less than 0.001 molar ratio with respect to the fatty acid because yield is low. On the other hand, it is not preferable if the content of the metallic catalyst is more than 0.5 molar ratio with respect to the fatty acid because it is not effective to use an excess metallic catalyst.

According to an embodiment of the present invention, the metallic catalyst is added to the mixture of the metal precursor and the fatty acid while agitating the mixture, and the mixture is heated to a temperature range of 80 to 150° C. while agitating the mixture. Here, the mixture is reacted for 0.5 to 4 hours.

It may be determined by the change of color whether the nanoparticles have been formed by the reaction. In the case of silver nanoparticles, red or blue color change occurs. The metal nanoparticles manufactured by this method may be collected by centrifugal separator after being precipitated in polar solvent without separating by size because the metal nanoparticles manufactured by the method are dispersed and stabilized in fatty acid.

According to an embodiment, methanol, ethanol, propanol, acetone, ether or a mixture thereof may be used as the polar solvent Conductive ink may be produced by dispersing the collected nanoparticles in hydrocarbon solvent having preferable ink composition.

In the present invention, the metal precursor is directly dissociated in fatty acid and is mixed without using an organic solvent, but the mixture may be mixed by at least one organic solvent selected from the group consisting of toluene, xylene, chloroform, dichloromethane and alkane having carbon numbers of 6 to 18 such as hexane, tetradecane, etc.

Also, the mixture may further include a reducing agent of additional borohydride system or hydrazine system, or another reducing organic solvent for yield and complete reaction. The examples of reducing agent may include $NaBH_4$, $LiBH_4$, $KBH_4$, tetrabutylammonium borohydride, $N_2H_4$, $PhHNNH_2$, glycol, glycerol, dimethylformamide, 1,2-pentanediol and 1,2-hexanediol.

Embodiments relating methods for manufacturing metal nanoparticles were set forth above, and hereinafter, explanations will be given in greater detail with reference to specific examples.

EXAMPLE $Ag(CH_3CO_2)$ of 72 g was heated to the temperature of 60° C. while being dissociated in oleic acid of 300 ml. $Sn(CH_3CO_2)_2$ of 7.2 g was added during agitation and was heated to the temperature of 80° C. The color of the solution changed into red or dark brown. After it reacted for 2 hours, the mixture was re-precipitated by using a polar solvent such as acetone, ethanol or methanol. The silver nanoparticles were collected by using the centrifugal separator.

The measured absorbance of the silver nanoparticles manufactured in the above embodiment was shown in FIG. 1. As shown in FIG. 1, a typical silver plasmon peak was seen in wavelength of 420 to 430 nm by a UV-Visible spectroscope.

Figure 2:
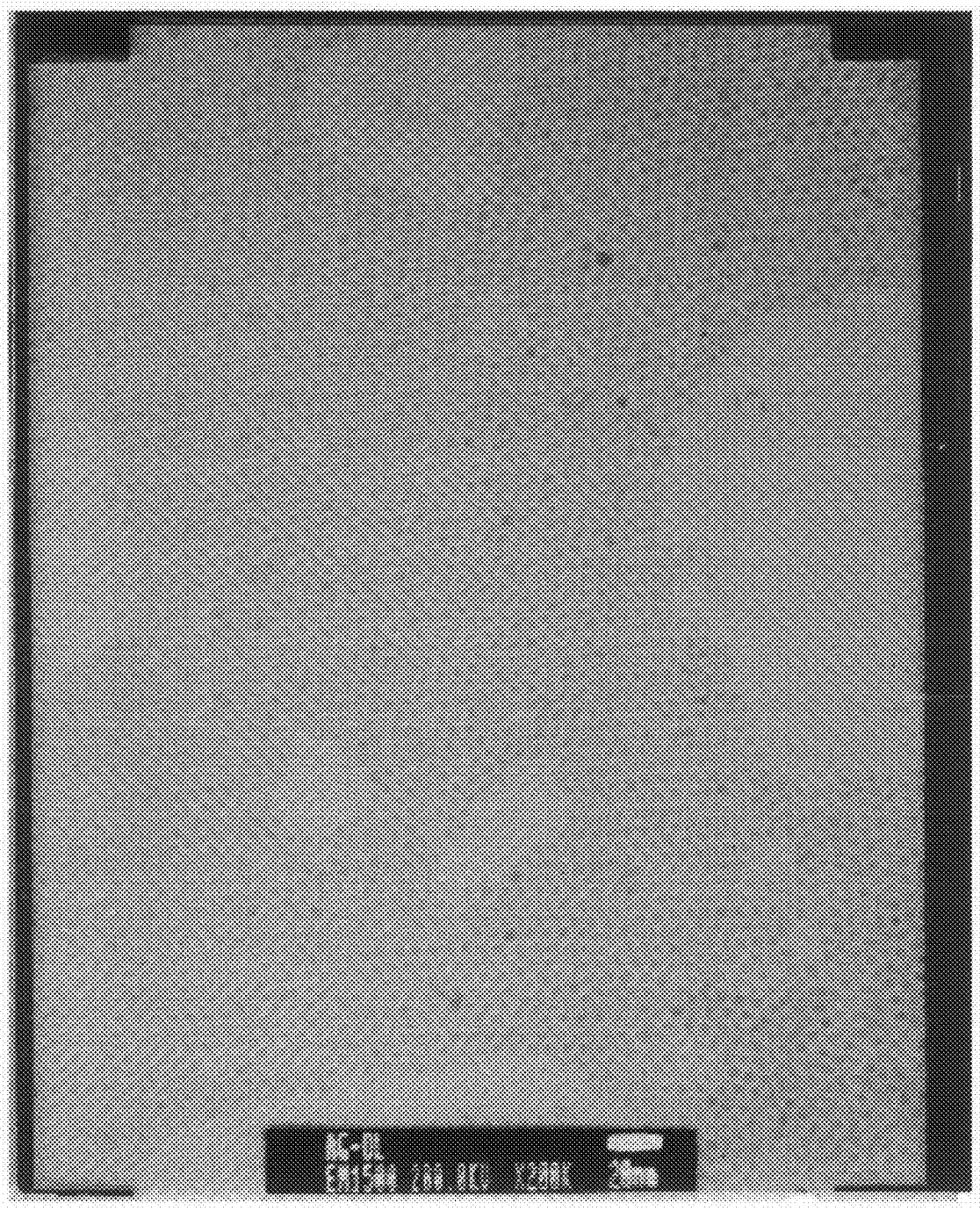
FIG. 2 is a. TEM photograph of silver nanoparticles manufactured by one embodiment of the present invention.

Moreover, TEM (transmission electron microscopy) photograph of the manufactured silver nanoparticles is shown in FIG. 2. As shown in FIG. 2, it could be confirmed by the result of TEM analysis that silver nanoparticles have a uniform size distribution, the size being 5 nm.

It is apparent that the present invention is not limited to the embodiments set forth above and many of applications may be made by those skilled in the art without departing from the principle and spirit of the present invention, the scope of which is defined in the appended claims and their equivalents.

As described in the above, according to a method for manufacturing metal nanoparticles of the present invention, highly concentrated nanoparticles having a uniform size distribution may be synthesized in a non-aqueous environment without use of any organic solvent, and metal nanoparticles may environment-friendlily be manufactured not making use of a reducing agent.

What is claimed is:

1. A method for manufacturing metal nanoparticles, the method comprising:
   forming a mixture by dissociating a metallic salt of a metal selected from the group consisting of Ag, Pd, Pt, Au and an alloy thereof as a metal precursor in fatty acid; and
   adding a metallic salt of a metal selected from the group consisting of $Sn(NO_3)_2$, $Sn(CH_3CO_2)_2$, and $Sn(acac)_2$ as a metallic catalyst into the mixture and mixing the mixture and the metallic salt.

2. The method of claim 1, wherein the metal precursor is a silver salt selected from the group consisting of $AgBF_4$, $AgCF_3SO_3$, $AgNO_3$, $AgClO_4$, $Ag(CH_3CO_2)$, $AgPF_6$ and $Ag_2O$.

3. The method of claim 1, wherein the metal precursor is mixed in a molar ratio of 0.01 to 1 molar ratio with respect to the fatty acid.

4. The method of claim 1, wherein the fatty acid is at least one selected from the group consisting of saturated fatty acid, oleic acid, linoleic acid, linolenic acid and highly unsaturated acid.

5. The method of claim 1, wherein the forming the mixture further comprises heating mixture to a temperature range of 40 to 80° C. after dissociating the metal precursor in the fatty acid.

6. The method of claim 1, wherein the metallic catalyst is mixed in a molar ratio of 0.001 to 0.5 with respect to the metal precursor.

7. The method of claim 1, wherein the adding the metallic catalyst and the mixing comprises:
   adding the metallic catalyst while agitating the mixture; and
   heating the mixture to a temperature range of 80 to 150° C.

8. The method of claim 7, wherein the mixture is reacted for 0.5 to 4 hours at the temperature range.

9. The method of claim 1, wherein the method further comprises obtaining the metal nanoparticles.

10. The method of claim 9, wherein the obtaining the metal nanoparticles is performed by adding polar solvent into the mixture and by precipitating the nanoparticles.

11. The method of claim 10, wherein the polar solvent is selected from the group consisting of methanol, ethanol, propanol, acetone, ether and a mixture thereof.

12. The method of claim 10, wherein the obtaining the nanoparticles further comprises separating nanoparticles, which are precipitated, by centrifugal separator from the mixture.

13. The method of claim 1, wherein the mixture further comprises at least one organic solvent selected from the group consisting of toluene, xylene, chloroform, dichloromethane and alkane having carbon numbers of 6 to 18 such as hexane, tetradecane, etc.

14. The method of claim 1, wherein the mixture further comprises at least one reducing agent selected from the group consisting of $NaBH_4$, $LiBH_4$, $KBH_4$, tetrabutylammonium borohydride, $N_2H_4$, $PhHNNH_2$, glycol, glycerol, dimethylformamide, 1,2-pentanediol, and 1,2-hexanediol.

15. Metal nanoparticles manufactured by the method of claim 1.

16. The metal nanoparticles of claim 15, wherein the metal nanoparticles have a uniform size distribution, the size being between 1 and 10 nm.

17. Conductive ink comprising the metal nanoparticles of claim 15.

* * * * *